United States Patent Office 2,871,719
Patented Feb. 3, 1959

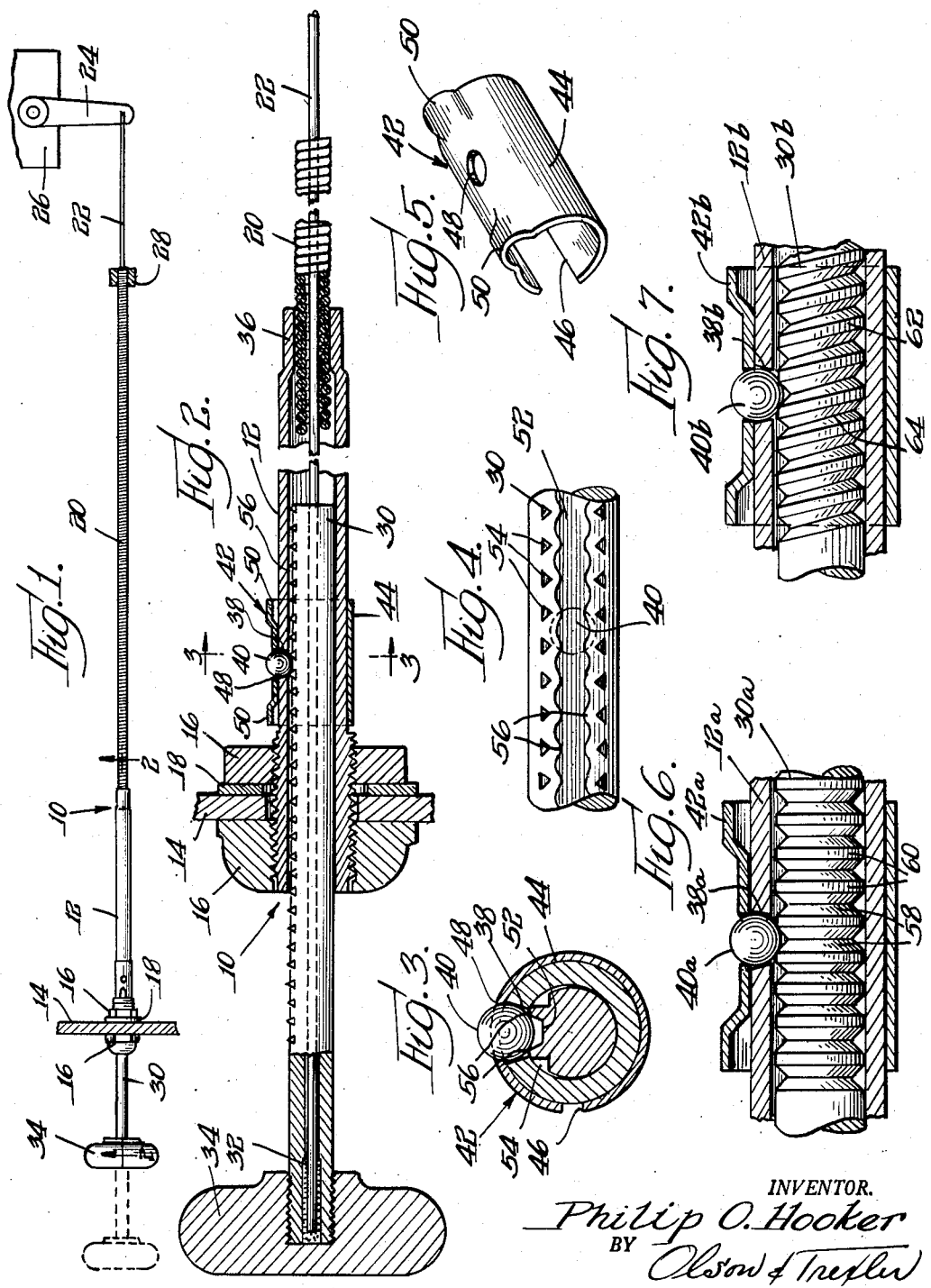

2,871,719

PUSH-PULL CONTROL

Philip O. Hooker, Wilmette, Ill., assignor to Arens Controls, Inc., Evanston, Ill., a corporation of Illinois Application July 6, 1954, Serial No. 441,521

10 Claims. (Cl. 74—503)

This invention is concerned generally with a push-pull control, and more particularly with a push-pull control of the flexible type.

Push-pull controls of the flexible type wherein an inner or operating member is longitudinally or rotatably movable, or both, in a supporting sheath are well known. Such controls are utilized for remote operation and have widespread uses in industry and such common and well-known uses as choke, throttle, heater controls, and inside hood locks in automobiles. Such controls often must be used under conditions of vibration in which the vibrations may be quite heavy, thus tending to change the setting of the control. The present invention is concerned with a control which is vibration-proof, and which requires no special locking or unlocking for operation. More specifically, this invention is concerned with the control of the foregoing character having a built-in click detent mechanism for holding light loads, such as small engine governors, air duct dampers, and others.

It is an object of this invention to provide a self-locking push-pull control which is more readily assembled and more economically produced than any heretofore known in the art.

More specifically, it is an object of this invention to provide an improved spring for a spring-and-ball detent mechanism in a self-locking push-pull control.

It is a further object of this invention to provide a spring-and-ball detent mechanism in a push-pull control which can be preassembled with the sleeve of the control before assembly with the inner or operating member of the control.

Another object of this invention is to provide an improved detent locking mechanism in a push-pull control preventing rotation of the inner or operating member, thereby avoiding torsional stress in the operating member and maintaining a control handle or the like in predetermined position so that indicia thereon would at all times be discernible in the proper position.

Yet another object of this invention is to provide an improved self-locking push-pull control wherein the control can be moved step by step in accordance with a detent mechanism, or can be moved freely.

A further object of this invention is to provide an improved push-pull control which is self-locking, and which may be utilized for a certain amount of rotary control without disturbing the self-locking of the push-pull control.

Still another object of this invention is to provide an improved self-locking push-pull control having a vernier adjustment.

Other and further objects and advantages of the present invention will be apparent from the following description when taken in connection with the accompanying drawings wherein:

Fig. 1 is an elevational view of a push-pull control embodying the principles of this invention;

Fig. 2 is an enlarged longitudinal sectional view taken substantially along the line 2—2 in Fig. 1;

Fig. 3 is a cross-sectional view taken along the line 3—3 of Fig 2;

Fig. 4 is a fragmentary view of a section of the inner or control member illustrating the self-locking feature of the invention;

Fig. 5 is a perspective view of the improved spring of the detent mechanism;

Fig. 6 is an enlarged longitudinal view of a modified form of the invention; and Fig. 7 is a view similar to Fig. 6 illustrating a further modification.

Referring now more specifically to the drawings, my self-locking control is shown generally in Figs. 1 and 2 and is identified by the numeral 10. The control includes a frame sleeve 12 which is mounted in a panel 14 by conventional means including nuts 16 and a washer 18 threaded on the outer surface of the sleeve. A sheath 20 extends longitudinally from the end of the frame sleeve 12 and may comprise a coiled spring wire.

An inner or control member 22 extends through the sheath and beyond the outer end thereof at which point it is attached to a member to be controlled such as an arm 24 on any suitable apparatus, mechanism, or device 26. It will be understood that the outer end of the sheath 20 is suitably anchored relative to the apparatus 26 by any known or suitable means as indicated at 28.

The inner end of the control member 22 is received in a complementary bore in an operating sleeve 30, the operating member being secured in the operating sleeve by any suitable means such as a press fit or by a weld, or otherwise as indicated generally at 32. A knob 34 or other suitable handle is mounted on the outer end of the operating sleeve 30 by screw threads or other suitable means. The operating sleeve forms a smooth sliding fit in the frame sleeve, and the frame sleeve is reduced in diameter as at 36 where it is attached to the sheath 20 to prevent movement of the operating sleeve and operating member beyond a predetermined position.

The frame sleeve 12 is formed with a transverse opening 38 therein, and this opening is frusto-conical in configuration with the inner end thereof having a smaller diameter than the outer diameter. A small spherical ball 40 is received in the hole 38, and it will be apparent from an inspection of the drawings that the small diameter at the inner end of the opening 38 is less than the diameter of the ball. Thus, the ball cannot move into the interior of the frame sleeve. However, the diameters of the ball and opening are so correlated that the ball projects part way into the operating sleeve 30.

The ball 40 is held in place by a spring 42 shown in Figs. 2, 3, and 5 in the form of a split sleeve. The spring sleeve 42 is generally in the form of a cylinder 44 having an elemental slit or interruption 46 to allow springing of the sleeve. The sleeve is provided intermediate its ends with a hole 48 of somewhat smaller diameter than the diameter of the ball 40 for holding the ball in the hole 38 with the spring sleeve 42 encircling the frame sleeve 12. The cylindrical portion 44 of the spring sleeve 42 further is provided at opposite ends with scoop-shaped portions 50. These scoops 50 serve to cam the spring sleeve 42 over the ball 40 when the spring sleeve is slipped longitudinally along the frame sleeve 12 for assembly with the frame sleeve and the ball. It will be apparent that the scoops materially facilitate assembly, and it further will be apparent that the conical hole 38 precludes the ball from moving in its entirety into the interior of the frame sleeve thereby permitting preassembly of the ball, frame sleeve, and spring sleeve without necessity that the operating sleeve first be assembled with the frame sleeve.

The operating sleeve 30 is provided with a longitudinally extending slot or groove 52 along one edge thereof. This groove could be formed by a milling operation, but it preferably is formed by rolling or extruding the operating sleeve. Indentations 54 of generally triangular shape are rolled into the operating sleeve 30 on opposite sides of the groove or slot 52, and such rolling swages the material along the edges of the slot or groove 52 upwardly from the surface of the operating sleeve, and also into the slot or groove 52 to form knurled ridges 56. The knurls of the ridges are aligned with one another and are of a proper dimension for cooperation with the ball 40 as best seen in Figs. 3 and 4 and also in Fig. 2 so that the ball, the spring sleeve 42, and the knurled ridges form a detent mechanism.

The detent mechanism is such that the operating sleeve 30 and operating member 22 can be moved longitudinally in a stepwise manner and are locked in place in any adjusted position without the necessity of any particular manipulation of the control. In other words, the detent mechanism makes the control self-locking. The slot or groove 52 tends to maintain the operating sleeve 30, and hence the operating member 22, against rotation in the frame sleeve 12 and the sheath 20. Thus, any indicia on the knob 34 will be maintained in a prearranged position of orientation. However, the operating sleeve and operating member can be rotated slightly if it is desired to do so to cam the ball out of the groove 52 against the spring 42. Thus, the operating sleeve and operating member can be moved without the ratcheting action that is present when the ball is in the groove between the knurled ridges. This may in some instances be desirable, and the operating sleeve can be turned back to its initial position after longitudinal adjustment to return the ball to the groove.

In some instances, it may be desirable to have some degree of rotary control in addition to the longitudinal control for which my vibration-proof push-pull controls are primarily designed. A modification of the invention designed for such purpose is shown in Fig. 6, and similar parts are identified by similar numerals to obviate the necessity of an extended explanation. The frame sleeve 12a, the ball 40a fitting in the frusto-conical opening 48a and the spring sleeve 42a all are substantially identical with those previously described. The difference resides in the operating sleeve 30a. In this form of the invention, the longitudinal groove and knurled ridges are omitted. Instead, the operating sleeve 30a is formed with a series of annular grooves 58 and ridges 60. The operating member ratchets past the ball 40a in much the same manner as the operating sleeve 30, coming to rest with the ball 40a in one of the grooves 58. The operating member 30a is more difficult and expensive to produce than the grooved and knurled operating member 30, but it does have the advantage that the operating member can impart a rotary control movement to a controlled apparatus or the like without disturbing its self-locked longitudinal position.

In some instances extremely fine control is desirable. A further modification of the invention having a vernier control is illustrated in Fig. 7. In this figure similar numerals are utilized to identify similar parts with the addition of the suffix b. The frame sleeve 12b, the frusto-conical hole 38b, the ball 40b and the spring sleeve 42b remain the same as previously described. The operating sleeve 30b in this embodiment of the invention is formed with a screw thread 62 having grooves 64 therebetween in which the ball 40b is received. Longitudinal movement of the operating sleeve causes the screw threads to ratchet past the ball 40b, and to stop with the ball in the groove 64. Subsequent rotation of the operating sleeve 30b causes the operating sleeve to thread past the ball 40b for a finely controlled longitudinal movement of the operating sleeve.

In view of the foregoing explanation of various embodiments of my invention, it will be apparent that I have provided an improved self-locking push-pull control. The split sleeve spring is simple and economical to fabricate, and is more simply assembled with the frame sleeve than any heretofore used in this art, while the frusto-conical hole receiving the detent ball allows the ball to project part way into the interior of the frame sleeve while precluding the ball from moving completely into the frame sleeve. Therefore, the frame sleeve, the ball, and the split sleeve spring can be preassembled before assembly with the operating sleeve. Furthermore, there is no danger of losing the ball if the operating sleeve is pushed or pulled too far. In addition, the scoops at the ends of the split sleeve spring facilitate assembly of the spring with the ball.

The operating sleeve disclosed in the first form of the invention is extremely simple and economical to produce, and furthermore tends to hold the operating sleeve in a predetermined rotary position for maintaining indicia on the operating knob upright, but allows the operating sleeve to be rotated slightly for smooth longitudinal movement.

In one of the ancillary embodiments of the invention rotary control can be obtained without disturbing the longitudinal adjustment, while in the other ancillary embodiment a vernier longitudinal movement is effected.

It is to be understood that the specific embodiments of the invention herein shown and described are for illustrative purposes only. Various additional structural changes will doubtless occur to those skilled in the art and will be understood as forming a part of the invention insofar as they fall within the spirit and scope of the appended claims.

I claim:

1. A push-pull control mechanism comprising supporting means, an operating member reciprocably mounted in said supporting means, said supporting means having a frusto-conical opening therethrough with the smaller diameter end thereof confronting said operating member, and engagement means carried in said opening and resiliently urged against said operating member for locking the same in adjusted position, said engagement means having a dimension larger than the smaller diameter of said opening, said operating member having a longitudinal groove engageable with said engagement member, the walls of said groove having a series of means successively engageable with said engagement member to lock said operating member in adjusted position.

2. A push-pull control mechanism as set forth in claim 1 wherein the side walls of the longitudinal groove are knurled.

3. A split spring sleeve for assembly with a control mechanism comprising a split cylindrical body having a ball locating section intermediate and spaced from its ends, and a scoop-like portion at either end for engagement with a ball to cam said split spring sleeve over a ball to be received in said ball locating section, said scoop-like portions being spaced from said ball locating section whereby to prevent inadvertent movement of a ball therefrom.

4. A control mechanism comprising supporting means having a tubular guide, a control member movably mounted in said guide, said guide having a lateral opening adjacent said control member, a ball received in said opening, and a split spring sleeve encircling said tubular guide and ball and resiliently urging said ball against said control member, said control member having a longitudinal groove receiving said ball for rotationally positioning said control member, the walls of said groove having a series of means successively engageable with said ball for effecting a ratcheting longitudinal movement.

5. A control mechanism comprising supporting means having a tubular guide, a control member movably mounted in said guide, said guide having a lateral opening adjacent said control member, a ball received in said opening, and a split spring sleeve encircling said tubular guide and ball and resiliently urging said ball against said control member, said control member having a longitudinal groove provided with knurled side walls and engageable with said ball for locking said control member in any predetermined position.

6. A push-pull control mechanism comprising supporting means, a control member mounted for longitudinal movement in said supporting means, and an engagement member carried from said supporting means and resiliently urged against said control member, said control member having a longitudinal groove receiving said engagement member and tending to lock said control member against rotary movement, the walls of said groove being provided with a series of means successively engageable with said engagement member for locking said control member in longitudinally adjusted position.

7. A push-pull control mechanism comprising supporting means, a control member mounted for longitudinal movement in said supporting means, and an engagement member carried from said supporting means and resiliently urged against said control member, said control member having a longitudinal groove receiving said engagement member and tending to lock said control member against rotary movement, the side walls of said groove being knurled for receiving said engagement member to lock said control member in longitudinally adjusted position.

8. A push-pull control mechanism comprising supporting means, a control member mounted for longitudinal movement in said supporting means, and an engagement member carried from said supporting means and resiliently urged against said control member, said control member having a longitudinal groove receiving said engagement member and tending to lock said control member against rotary movement, said control member being provided on opposite sides of said longitudinal groove with a succession of indentations accompanied by corresponding protuberances in said groove for ratcheting engagement with said engagement member to lock said control member in longitudinally adjusted position.

9. A control mechanism comprising frame means including a substantially cylindrical guide having a hole in the side thereof, an operating member movably carried in said guide and having means engageable with a locking ball, a ball received in said hole in said guide and engageable with the series of means on said operating member, and a split spring sleeve encircling said guide and said ball, said split spring sleeve being provided with a scoop-like portion at one end thereof facilitating assembly with said ball and having a ball locating portion spaced longitudinally from said scoop-like portions and resiliently urging said ball inwardly of said guide into engagement with said series of means on said operating member.

10. A control mechanism comprising supporting means having a tubular guide, a control member movably mounted in said guide, said guide having a lateral opening adjacent said control member, a ball received in said opening, and a split spring sleeve encircling said tubular guide and ball and resiliently urging said ball against said control member, said split spring sleeve being provided at opposite ends with scoop-like portions for camming said split spring sleeve over said ball into assembled relation therewith, said control member having means spaced from said scoop-like portions longitudinally of said sleeve and cooperable with said ball for locating said control member.

References Cited in the file of this patent

UNITED STATES PATENTS

| | | |
|---|---|---|
| 388,074 | Reardon et al. | Aug. 21, 1888 |
| 1,575,826 | Goetz | Mar. 6, 1926 |
| 1,619,117 | Gray | Mar. 1, 1927 |
| 1,761,943 | Summers et al. | June 3, 1930 |
| 2,592,361 | Weber | Apr. 8, 1952 |
| 2,638,015 | Schoelles | May 12, 1953 |
| 2,640,242 | Weimer | June 2, 1953 |

FOREIGN PATENTS

| | | |
|---|---|---|
| 189,116 | Great Britain | Nov. 8, 1923 |
| 755,054 | France | Sept. 4, 1933 |
| 1,037,920 | France | May 6, 1953 |